United States Patent
Ting

(10) Patent No.: US 10,308,215 B2
(45) Date of Patent: Jun. 4, 2019

(54) DETACHABLE STEERING WHEEL

(71) Applicant: Primax Electronics Ltd., Taipei (TW)

(72) Inventor: Kuan-Pao Ting, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 107 days.

(21) Appl. No.: 15/790,415

(22) Filed: Oct. 23, 2017

(65) Prior Publication Data

US 2018/0319367 A1 Nov. 8, 2018

(30) Foreign Application Priority Data

May 5, 2017 (TW) .............................. 106115021 A

(51) Int. Cl.
| | |
|---|---|
| *B60R 25/022* | (2013.01) |
| *B60R 25/25* | (2013.01) |
| *B62D 1/04* | (2006.01) |
| *B62D 1/10* | (2006.01) |

(52) U.S. Cl.
CPC ........ *B60R 25/0222* (2013.01); *B60R 25/252* (2013.01); *B62D 1/04* (2013.01); *B62D 1/10* (2013.01)

(58) Field of Classification Search
CPC ..... B60R 25/0222; B60R 25/252; B62D 1/04; B62D 1/10; B62D 1/183
USPC .......................................................... 74/552
See application file for complete search history.

(56) References Cited

U.S. PATENT DOCUMENTS

| | | | | |
|---|---|---|---|---|
| 4,901,544 A | * | 2/1990 | Jang .................... | B60R 25/0222 70/218 |
| 7,527,293 B1 | * | 5/2009 | Wang ....................... | B62D 1/10 200/61.54 |
| 9,821,765 B1 | * | 11/2017 | Miller ............... | B60R 25/02147 |
| 2003/0048000 A1 | * | 3/2003 | Harter ..................... | B60R 25/04 307/10.6 |
| 2003/0090154 A1 | * | 5/2003 | Takezaki ................. | B60R 25/04 307/10.2 |

(Continued)

FOREIGN PATENT DOCUMENTS

| | | | | |
|---|---|---|---|---|
| DE | 3811228 C1 | * | 9/1989 | ......... B60R 25/0222 |
| FR | 2723557 A1 | * | 2/1996 | ......... B60R 25/0222 |

(Continued)

*Primary Examiner* — Ruth Ilan
(74) *Attorney, Agent, or Firm* — Kirton McConkie; Evan R. Witt

(57) ABSTRACT

A detachable steering wheel includes a steering wheel body, an electric sleeve, a fixing mechanism, a controlling module and an identifying module. The steering wheel body includes a direction grip and a connection shaft. The connection shaft is inserted into a steering column. Moreover, plural indentations are formed in the connection shaft. The electric sleeve is movably sheathed around the steering column. The fixing mechanism includes plural rolling balls and plural openings. The plural openings are penetrated through the corresponding openings and connected with the corresponding indentations. The controlling module is installed in the steering column and electrically connected with the electric sleeve. The identifying module is installed in the direction grip and electrically connected with the controlling module. Due to these structures, the intelligent anti-theft purpose is achieved.

15 Claims, 5 Drawing Sheets

(56) References Cited

U.S. PATENT DOCUMENTS

| | | | |
|---|---|---|---|
| 2003/0204290 A1* | 10/2003 | Sadler | B60R 25/04 701/1 |
| 2004/0041689 A1* | 3/2004 | DeBono | B60R 25/066 340/5.52 |
| 2006/0274920 A1* | 12/2006 | Tochikubo | G06F 21/32 382/124 |
| 2007/0193315 A1* | 8/2007 | Ichikawa | B60R 25/0222 70/207 |
| 2010/0060412 A1* | 3/2010 | Johnson | B60R 25/04 340/5.53 |
| 2011/0125370 A1* | 5/2011 | Lefaure | B62H 5/06 701/41 |
| 2013/0118297 A1* | 5/2013 | Goh | B62D 1/10 74/552 |

FOREIGN PATENT DOCUMENTS

| | | | | |
|---|---|---|---|---|
| GB | 2216083 A | * | 10/1989 | ......... B60R 25/0222 |
| GB | 2292923 A | * | 3/1996 | ......... B60R 25/0222 |
| WO | WO-9605085 A1 | * | 2/1996 | ......... B60R 25/0222 |
| WO | WO-2004/071823 A1 | * | 8/2004 | |
| WO | WO-2005/014348 A1 | * | 2/2005 | |

\* cited by examiner

DETACHABLE STEERING WHEEL

FIELD OF THE INVENTION

The present invention relates to a detachable steering wheel.

BACKGROUND OF THE INVENTION

When a car is not used, the driver may pull out a key from the car and lock the door of the car through the key or a remote control key. Since the car door is locked, the possibility of losing the car through steal is reduced.

However, if a thief has a device capable of copying the car key or cracking the remote control key, the thief can easily copy the car key or decode the password of the remote control key and easily steal the car. For solving the above problems, the driver may purchase a steering wheel lock and install the steering wheel lock on the steering wheel. Under this circumstance, the steering wheel cannot be rotated. Even if the thief enters the car and starts the car, the driver cannot operate the steering wheel.

Generally, the structure of the steering wheel lock is simple. Regardless of whether the password lock or the key lock is used, the thief can easily use a tool to destroy the steering wheel lock. After the steering wheel lock malfunctions, the thief can steal and drive away the car. In other words, the steering wheel lock can only delay the thief to steal the car.

Moreover, the driver may install an anti-theft device in the car. If the thief touches the main body of the car, the anti-theft device produces a loud sound to notify the driver that the car is being stolen by a thief. However, if the driver is far away from the car, the driver cannot hear the sound from the anti-theft device. Since the driver cannot hear the sound from the anti-theft device, the driver cannot go to the parking place of the car immediately in order to prevent the thief from stealing the car. In other words, the conventional technologies need to be further improved.

SUMMARY OF THE INVENTION

An object of present invention provides a detachable steering wheel.

In accordance with an aspect of the present invention, there is provided a detachable steering wheel. The detachable steering wheel is installed on a steering column. The detachable steering wheel includes a steering wheel body, an electric sleeve, a fixing mechanism, a controlling module and an identifying module. The steering wheel body includes a direction grip and a connection shaft. The connection shaft is protruded from the direction grip. The connection shaft is inserted into the steering column. Moreover, plural indentations are formed in an outer surface of the connection shaft. The electric sleeve is movably sheathed around the steering column. The fixing mechanism includes plural rolling balls and plural openings. The plural rolling balls are connected with an inner wall of the electric sleeve. The plural openings are formed in the steering column. When a side of each rolling ball is penetrated through the corresponding opening and connected with the corresponding indentation, the connection shaft is fixed in the steering column. The controlling module is installed in the steering column and electrically connected with the electric sleeve. The identifying module is installed in the direction grip and electrically connected with the controlling module. An identification data is stored in the identifying module. When a capturing signal obtained by the identifying module matches the identification data, the controlling module drives movement of the electric sleeve in a direction away from the steering wheel body and the plural rolling balls are moved out of the corresponding indentations, so that the connection shaft is disengaged from the steering column and removed from the steering column. In other words, the steering wheel body can be easily assembled or disassembled.

In an embodiment, the electric sleeve includes a sleeve body and at least one electric retractable element. The sleeve body is movably sheathed around the steering column. The plural rolling balls are connected with an inner wall of the sleeve body. A first end of the electric retractable element is connected with an end of the sleeve body away from the direction grip. A second end of the electric retractable element is connected with a side of the steering column away from the direction grip. The controlling module is electrically connected with the electric retractable element. Preferably, the plural indentations are annularly arranged on the outer surface of the connection shaft, and the plural rolling balls are annularly arranged on the inner wall of the sleeve body. Preferably, the plural rolling balls are elastically movable on the inner wall of the sleeve body. Preferably, the fixing mechanism further comprises a raised ring. The raised ring is externally protruded from an end of the steering column away from the steering wheel body. A side of the electric retractable element away from the sleeve body is connected with the steering column through the raised ring. When the controlling module drives a retracting action of the electric retractable element, the electric sleeve is moved toward the raised ring. Preferably, the raised ring and the steering column are collaboratively formed as a combination structure with a T-shaped cross section. In an embodiment, the electric retractable element is an annular electric retractable element, and the electric retractable element is arranged around the steering column. In another embodiment, the at least one electric retractable element includes plural electric retractable elements, and the plural electric retractable elements are electric retractable rods. Moreover, the plural electric retractable elements are annularly and discretely arranged around the steering column at regular spacing intervals. Preferably, the raised ring comprises plural fixing holes corresponding to the respective electric retractable elements. A side of each electric retractable element away from the sleeve body is connected with and fixed in the corresponding fixing hole. In other words, the detachable steering wheel has a simplified structure and is easily assembled.

In an embodiment, the identifying module includes a capturing element and a controlling unit. The capturing element is electrically connected with the controlling module and the controlling unit. The capturing signal is obtained by the capturing element. Preferably, the identifying module further includes a storage element. The storage element is electrically connected with the controlling unit. The identification data is stored in the storage element. Preferably, the capturing element is a fingerprint capturing element, the controlling unit is a microcontroller, and the storage element is a memory. Preferably, the controlling module includes a controlling element, and the controlling element is electrically connected with the controlling unit and the at least one electric retractable element. Preferably, the controlling module further includes a power supply element. The power supply element is electrically connected with the controlling element, the controlling unit and the at least one electric retractable element. Preferably, the controlling element is an automotive microcontroller, and the power supply element is a battery. Consequently, an intelligent anti-theft purpose can be achieved.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
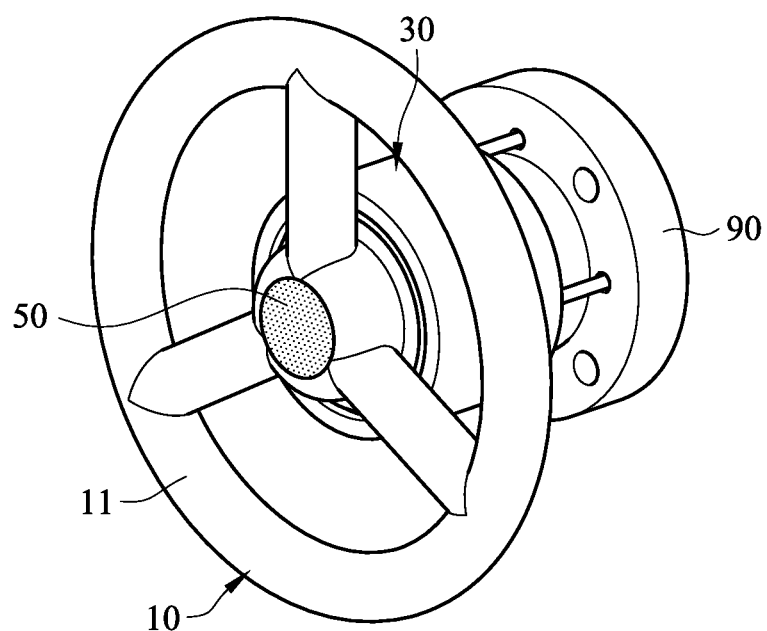
FIG. 1 is a schematic perspective view illustrating a detachable steering wheel according to an embodiment of the present invention.
Figure 2:
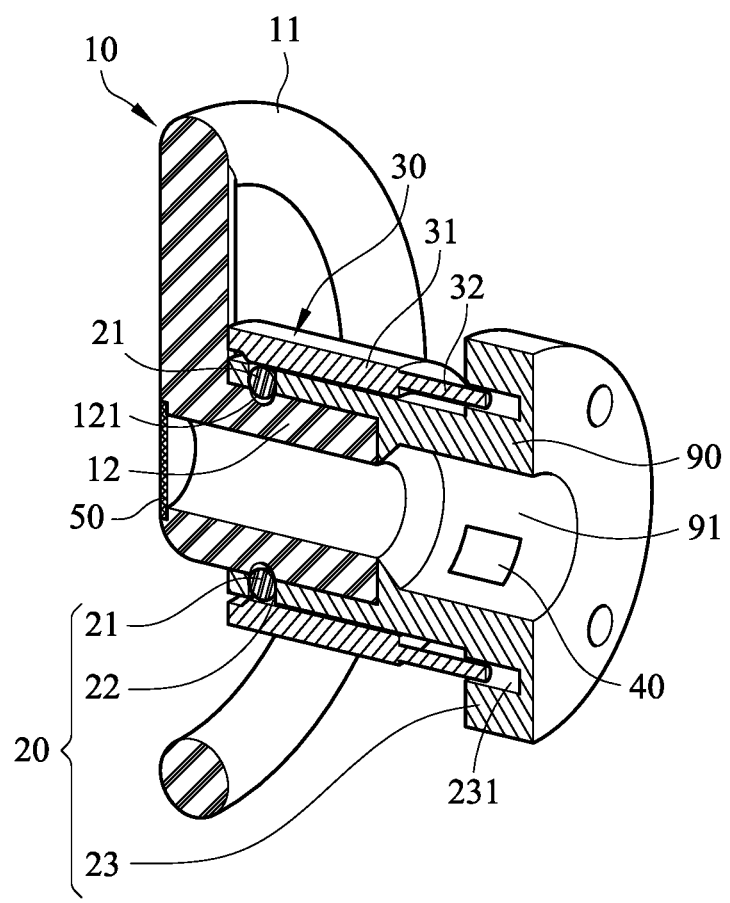
FIG. 2 is a schematic cutaway view illustrating the detachable steering wheel according to the embodiment of the present invention.
Figure 3:
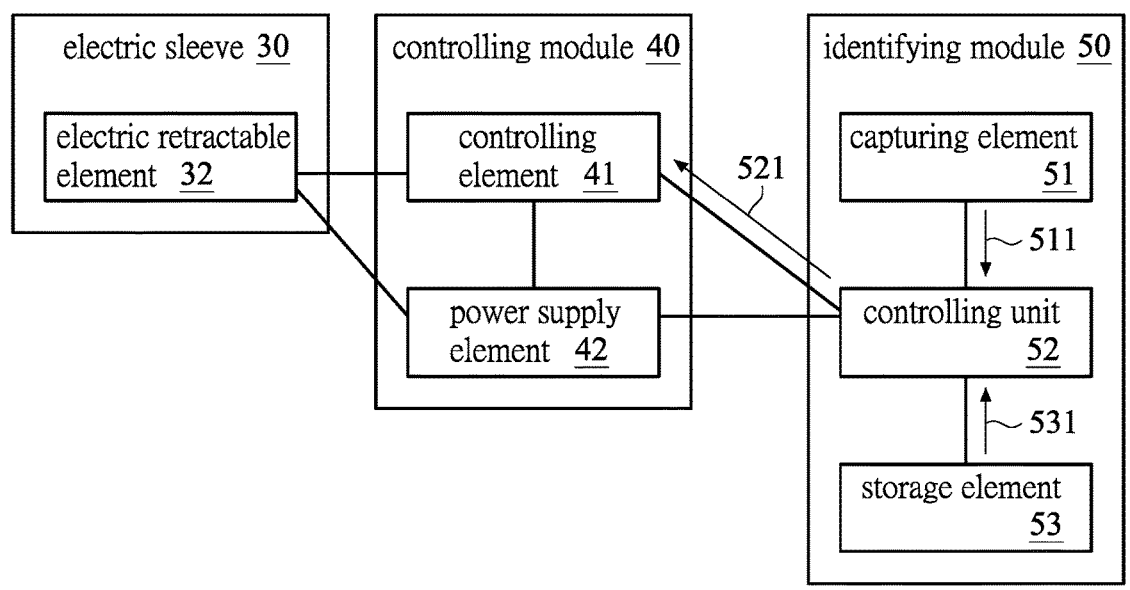
FIG. 3 is a schematic functional block diagram illustrating the architecture of the detachable steering wheel according to the embodiment of the present invention.

FIG. 1 is a schematic perspective view illustrating a detachable steering wheel according to an embodiment of the present invention. FIG. 2 is a schematic cutaway view illustrating the detachable steering wheel according to the embodiment of the present invention. FIG. 3 is a schematic functional block diagram illustrating the architecture of the detachable steering wheel according to the embodiment of the present invention. The detachable steering wheel 100 is installed on a steering column 90. In this embodiment, the detachable steering wheel 100 comprises a steering wheel body 10, a fixing mechanism 20, an electric sleeve 30, a controlling module 40 and an identifying module 50.

The steering wheel body 10 comprises a direction grip 11 and a connection shaft 12. The connection shaft 12 is protruded from an end of the direction grip 11. The steering column 90 comprises a connection space 91. The connection space 91 is formed in a side of the steering column 90. The connection shaft 12 is inserted into the connection space 91 of the steering column 90. Moreover, plural indentations 121 are formed in an outer surface of the connection shaft 12. The plural indentations 121 are annularly arranged around the outer surface of the connection shaft 12.

The fixing mechanism 20 comprises plural rolling balls 21, plural openings 22 and a raised ring 23. The plural openings 22 are formed in the steering column 90. Moreover, the plural openings 22 are annularly arranged around the steering column 90. The locations of the openings 22 correspond to the locations of the indentations 121. The raised ring 23 is externally protruded from an end of the steering column 90 that is away from the steering wheel body 10. Consequently, the raised ring 23 and the steering column 90 are collaboratively formed as a combination structure with a T-shaped cross section.

The electric sleeve 30 comprises a sleeve body 31 and at least one electric retractable element 32. The sleeve body 31 is movably arranged around the steering column 90. The rolling balls 21 are contacted with an inner wall of the sleeve body 31. Moreover, the rolling balls 21 are annularly arranged on the inner wall of the sleeve body 31. More especially, the rolling balls 21 are elastically movable on the inner wall of the sleeve body 31. The locations of the rolling balls 21 correspond to the locations of the indentations 121 and the locations of the openings 22. The sides of the rolling balls 21 away from the sleeve body 31 are penetrated through the corresponding openings 22 and engaged with the corresponding indentations 121. Consequently, the connection shaft 12 is fixed in the connection space 91 of the steering column 90. A first end of the electric retractable element 32 is connected with an end of the sleeve body 31 that is away from the direction grip 11. A second end of the electric retractable element 32 is connected with the raised ring 23. In case that the electric sleeve 30 comprises a single electric retractable element 32, the electric retractable element 32 is an annular electric retractable element. Under this circumstance, the electric retractable element 32 is arranged around the steering column 90.

In case that the electric sleeve 30 comprises plural electric retractable elements 32, the plural electric retractable elements 32 are electric retractable rods. Moreover, the plural electric retractable elements 32 are annularly and discretely arranged around the steering column 90 at regular spacing intervals. The raised ring 23 comprises plural fixing holes 231 corresponding to the respective electric retractable elements 32. The sides of the electric retractable elements 32 away from the sleeve body 31 are connected with and fixed in the corresponding fixing holes 231.

The controlling module 40 is installed in the connection space 91 of the steering column 90. The controlling module 40 comprises a controlling element 41 and a power supply element 42. The controlling element 41 is electrically connected with the electric retractable elements 32 and the power supply element 42. The power supply element 42 is electrically connected with the electric retractable elements 32. For example, the controlling element 41 is an automotive microcontroller, and the power supply element 42 is a battery. The power supply element 42 is a power source for powering the electric retractable elements 32 and the controlling element 41.

The identifying module 50 is installed in the direction grip 11. The identifying module 50 comprises a capturing element 51, a controlling unit 52 and a storage element 53. The controlling unit 52 is electrically connected with the controlling element 41, the power supply element 42, the capturing element 51 and the storage element 53. The power supply element 42 provides electric power to the identifying module 50. The capturing element 51 can obtain a capturing signal 511. The storage element 53 stores an identification data 531. The identification data 531 contains a fingerprint information. The capturing element 51 is a fingerprint capturing element. The controlling unit 52 is a microcontroller. The storage element 53 is a memory.

Figure 4:
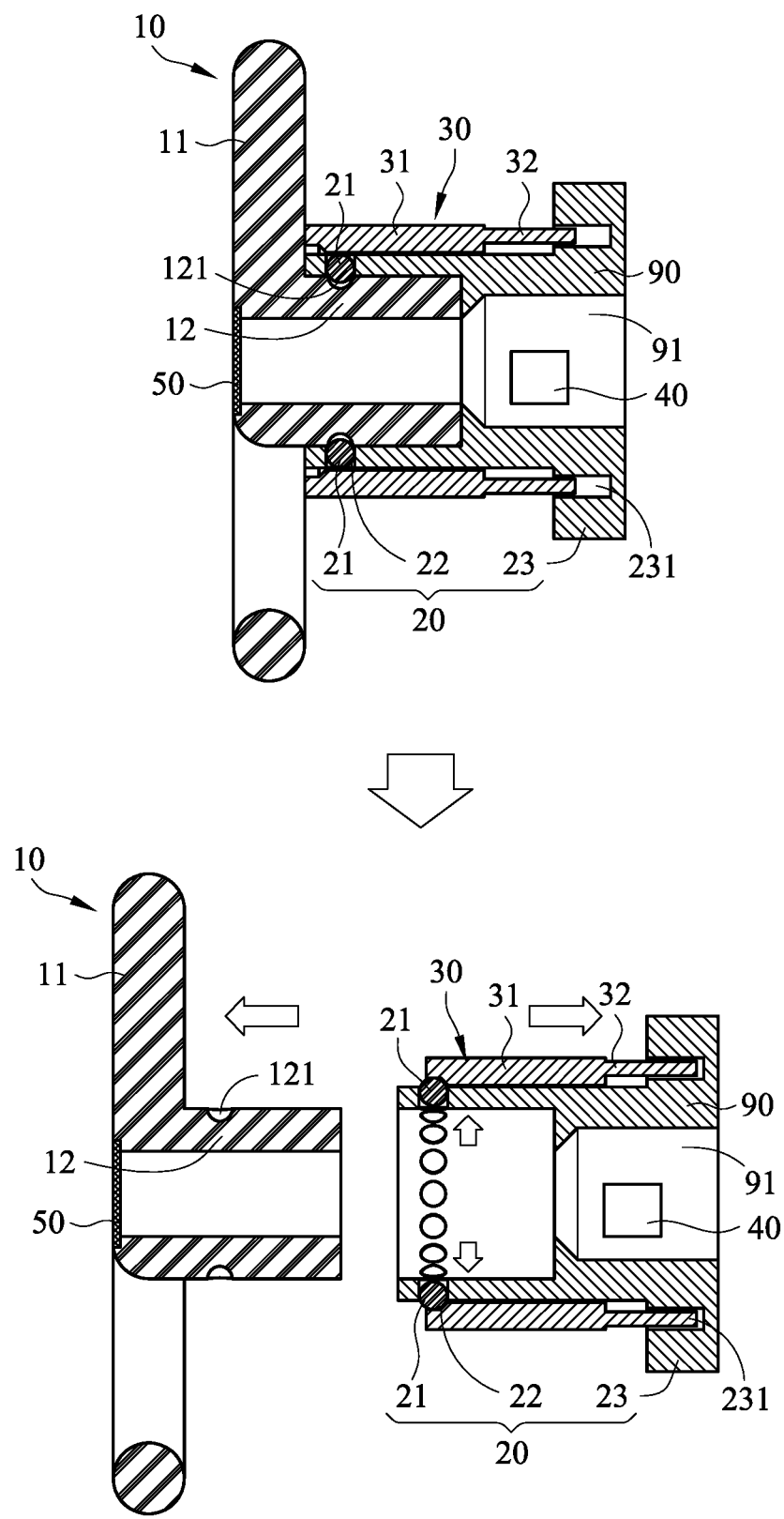
FIG. 4 is a schematic cross-sectional view illustrating an example of using the detachable steering wheel according to the embodiment of the present invention.

FIG. 4 is a schematic cross-sectional view illustrating an example of using the detachable steering wheel according to the embodiment of the present invention. Please refer to FIGS. 3 and 4. Firstly, the user's finger presses the identifying module 50, which is installed in the direction grip 11. Meanwhile, the capturing element 51 of the identifying module 50 captures the fingerprint of the user and obtains a capturing signal 511 that contains the fingerprint information of the user. Then, the capturing signal 511 is transmitted to the controlling unit 52. After the controlling unit 52 receives the capturing signal 511, the controlling unit 52 reads out the identification data 531 from the storage element 53. Then, the controlling unit 52 compares the capturing signal 511 with the content of the identification data 531. If the fingerprint information of the capturing signal 511 matches the fingerprint information of the identification data 531, the controlling unit 52 issues a notification signal 521 to the controlling element 41. After the controlling element 41 receives the notification signal 521, the controlling element 41 drives the retracting actions of the electric retractable elements 32. That is, the sleeve body 31 is moved toward the raised ring 23. As the rolling balls 21 are moved toward the inner wall of the sleeve body 31, the rolling balls 21 are moved from the corresponding indentations 121. Consequently, the connection shaft 12 is disengaged from the connection space 91 of the steering column 90, and the connection shaft 12 is smoothly pulled out of the connection space 91 of the steering column 90. Under this circumstance, the purpose of detaching the steering wheel body 10 from the steering column 90 is achieved. When the car is not used, the user may detach the steering wheel body 10 from the steering column 90. Even if the thief copies the car key or decodes the password of the remote control key and enters the car, the driver cannot drive the car. Consequently, the anti-theft purpose is achieved.

Figure 5:
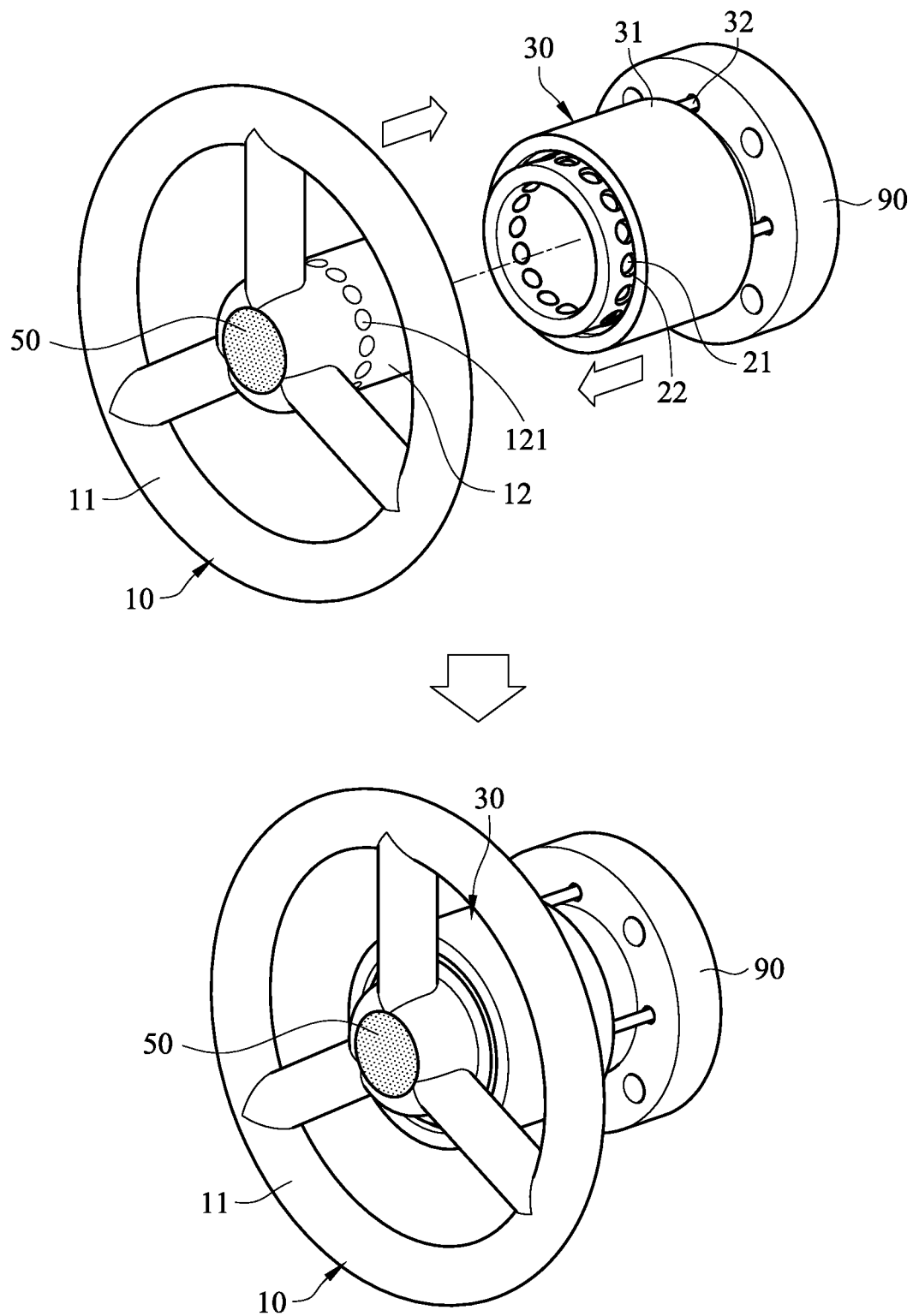
FIG. 5 is a schematic perspective view illustrating an example of using the detachable steering wheel according to the embodiment of the present invention.

FIG. 5 is a schematic perspective view illustrating an example of using the detachable steering wheel according to the embodiment of the present invention. For using the car, the steering wheel body 10 needs to be installed on the steering column 90 again. Firstly, the connection shaft 12 is inserted into the connection space 91 of the steering column 90. Consequently, the controlling unit 52 of the identifying module 50 is electrically connected with the controlling element 41 and the power supply element 42 of the controlling module 40. Consequently, the power supply element 42 provides electric power to the identifying module 50. Then, the user's finger presses the identifying module 50. Consequently, the capturing element 51 captures the fingerprint of the user and obtains the capturing signal 511 that contains the fingerprint information of the user. Then, the capturing signal 511 is transmitted to the controlling unit 52. After the controlling unit 52 receives the capturing signal 511, the controlling unit 52 reads out the identification data 531 from the storage element 53. Then, the controlling unit 52 compares the capturing signal 511 with the content of the identification data 531. If the fingerprint information of the capturing signal 511 matches the fingerprint information of the identification data 531, the controlling unit 52 issues a notification signal 521 to the controlling element 41 of the controlling module 40. After the controlling element 41 receives the notification signal 521, the controlling element 41 drives the stretching actions of the electric retractable elements 32. That is, the sleeve body 31 is moved toward the direction grip 11. As the rolling balls 21 are moved away from the inner wall of the sleeve body 31, the rolling balls 21 are gradually inserted into the corresponding indentations 121 of the connection shaft 12. Due to the engagement between the rolling balls 21 and the corresponding indentations 121, the electric sleeve 30 and the steering column 90 are connected with the connection shaft 12. Consequently, the connection shaft 12 is engaged with the connection space 91 of the steering column 90, and the connection shaft 12 is securely fixed in the steering column 90. Under this circumstance, the purpose of installing the steering wheel body 10 in the steering column 90 is achieved. Consequently, the steering wheel 100 can be smoothly operated to drive the car.

As mentioned above, it is necessary to press the user's finger on the identifying module 50 before the steering wheel body 10 is stalled in the steering column 90. Consequently, the identifying module 50 performs the fingerprint comparison. If the fingerprint information of the capturing signal 511 matches the fingerprint information of the identification data 531, the controlling element 41 drives the stretching actions of the electric retractable elements 32. In case that the other user wants to assemble other steering wheel body with the steering column 90, the electric retractable elements 32 cannot be stretched. Since other steering wheel body cannot be assembled with the steering column 90 and fixed in the connection space 91 of the steering column 90, the intelligent anti-theft purpose can be achieved.

As the electric sleeve 30 is moved relative to the outer surface of the steering column 90, the rolling balls 21 of the fixing mechanism 20 are selectively inserted into the corresponding indentations 121 of the connection shaft 12 or removed from the corresponding indentations 121 of the connection shaft 12. Consequently, the connection shaft 12 is selectively fixed in the steering column 90 or detached from the steering column 90 according to the practical requirement. In other words, the detachable steering wheel of the present invention has a simplified structure and is easily assembled.

From the above description, the detachable steering wheel of the present invention has many benefits. Firstly, the steering wheel body 10 can be easily assembled or disassembled because of the fixing mechanism 20, the electric sleeve 30 and the controlling module 40. Secondly, the arrangement of the identifying module 50 achieves the intelligent anti-theft purpose. Thirdly, as the electric sleeve 30 is driven and moved, the rolling balls 21 are selectively inserted into the corresponding indentations 121 or removed from the corresponding indentations 121. Consequently, the connection shaft 12 is selectively fixed in the steering column 90 or detached from the steering column 90 according to the practical requirement. In other words, the detachable steering wheel of the present invention has a simplified structure and is easily assembled.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A detachable steering wheel installed on a steering column, the detachable steering wheel comprising:
    a steering wheel body comprising a direction grip and a connection shaft, wherein the connection shaft is protruded from the direction grip, the connection shaft is inserted into the steering column, and plural indentations are formed in an outer surface of the connection shaft;
    an electric sleeve movably sheathed around the steering column;
    a fixing mechanism comprising plural rolling balls and plural openings, wherein the plural rolling balls are connected with an inner wall of the electric sleeve, and the plural openings are formed in the steering column, wherein when a side of each rolling ball is penetrated through a corresponding opening and connected with a corresponding indentation, the connection shaft is fixed in the steering column;
    a controlling module installed in the steering column and electrically connected with the electric sleeve; and an identifying module installed in the direction grip and electrically connected with the controlling module, wherein an identification data is stored in the identifying module, wherein when a capturing signal obtained by the identifying module matches the identification data, the controlling module drives movement of the electric sleeve in a direction away from the steering wheel body and the plural rolling balls are moved out of the corresponding indentations, so that the connection shaft is disengaged from the steering column and removed from the steering column.

2. The detachable steering wheel according to claim 1, wherein the electric sleeve comprises a sleeve body and at least one electric retractable element, wherein the sleeve body is movably sheathed around the steering column, the plural rolling balls are connected with an inner wall of the sleeve body, a first end of the electric retractable element is connected with an end of the sleeve body away from the direction grip, a second end of the electric retractable element is connected with a side of the steering column away from the direction grip, and the controlling module is electrically connected with the electric retractable element.

3. The detachable steering wheel according to claim 2, wherein the plural indentations are annularly arranged on the outer surface of the connection shaft, and the plural rolling balls are annularly arranged on the inner wall of the sleeve body.

4. The detachable steering wheel according to claim 2, wherein the plural rolling balls are elastically movable on the inner wall of the sleeve body.

5. The detachable steering wheel according to claim 2, wherein the fixing mechanism further comprises a raised ring, wherein the raised ring is externally protruded from an end of the steering column away from the steering wheel body, and a side of the electric retractable element away from the sleeve body is connected with the steering column through the raised ring, wherein when the controlling module drives a retracting action of the electric retractable element, the electric sleeve is moved toward the raised ring.

6. The detachable steering wheel according to claim 5, wherein the raised ring and the steering column are collaboratively formed as a combination structure with a T-shaped cross section.

7. The detachable steering wheel according to claim 5, wherein the electric retractable element is an annular electric retractable element, and the electric retractable element is arranged around the steering column.

8. The detachable steering wheel according to claim 5, wherein the at least one electric retractable element comprises plural electric retractable elements, and the plural electric retractable elements are electric retractable rods, wherein the plural electric retractable elements are annularly and discretely arranged around the steering column at regular spacing intervals.

9. The detachable steering wheel according to claim 8, wherein the raised ring comprises plural fixing holes corresponding to the respective electric retractable elements, wherein a side of each electric retractable element away from the sleeve body is connected with and fixed in the corresponding fixing hole.

10. The detachable steering wheel according to claim 2, wherein the identifying module comprises a capturing element and a controlling unit, wherein the capturing element is electrically connected with the controlling module and the controlling unit, and the capturing signal is obtained by the capturing element.

11. The detachable steering wheel according to claim 10, wherein the identifying module further comprises a storage element, wherein the storage element is electrically connected with the controlling unit, and the identification data is stored in the storage element.

12. The detachable steering wheel according to claim 11, wherein the capturing element is a fingerprint capturing element, the controlling unit is a microcontroller, and the storage element is a memory.

13. The detachable steering wheel according to claim 10, wherein the controlling module comprises a controlling element, and the controlling element is electrically connected with the controlling unit and the at least one electric retractable element.

14. The detachable steering wheel according to claim 13, wherein the controlling module further comprises a power supply element, and the power supply element is electrically connected with the controlling element, the controlling unit and the at least one electric retractable element.

15. The detachable steering wheel according to claim 14, wherein the controlling element is an automotive microcontroller, and the power supply element is a battery.

* * * * *